Inventor
David Norman HUTCHINSON

Attorney

United States Patent Office 3,124,644
Patented Mar. 10, 1964

3,124,644
AUCTION BIDDING TELEGRAPH SYSTEMS
David Norman Hutchinson, Dorval, Quebec, Canada, assignor to The Bell Telephone Company of Canada, Montreal, Quebec, Canada, a corporation of Canada
Filed June 8, 1962, Ser. No. 201,079
6 Claims. (Cl. 178—3)

This invention relates to data transmitting and receiving telegraph systems and more particularly to auction bidding teleprinter systems.

In auction bidding teleprinter systems, in which a number of subscribers are individually connected to a master office, it is desirable that the offerings, transmitted from the master office, be transmitted simultaneously to all the subscribers and the identity of the subscriber who bids be withheld from the other subscribers and at the same time, a record of the offerings is made.

An object of this invention is to provide a teleprinter auction bidding system to simultaneously transmit offerings to a number of subscribers' stations from a master office.

Another object of this invention is to provide an auction bidding system having the foregoing properties with means to receive at the master office bids from the subscribers' stations.

A further object of this invention is to provide an auction bidding system having the foregoing properties with means to prevent the identity of the bidder from the other subscribers.

Another object of the invention is to provide a teleprinter auction bidding system having the foregoing properties with means to print the subscriber's code letters at the master office and at the subscriber's station when a bid is made.

A still further object of the invention is to provide an auction bidding circuit having the foregoing properties with means to operate the teleprinter at the master office to transmit to the bidding subscriber only.

Another object of this invention is to provide a teleprinter auction bidding system with means to prevent tie bids.

These and other objects of this invention are attained by providing a teleprinter auction bidding system which includes a number of subscribers' stations connected to a master office to form individual telegraph loop circuits. A control circuit, responsive to the operation of the receiving circuit, effects a selecting diode matrix so as to control the bidding and the transmission circuits of the system. Connected into each loop is a sending and receiving circuit. The sending circuits are connected to a teleprinter to transmit signals to, all or individually, the subscribers' stations.

Figure 1:
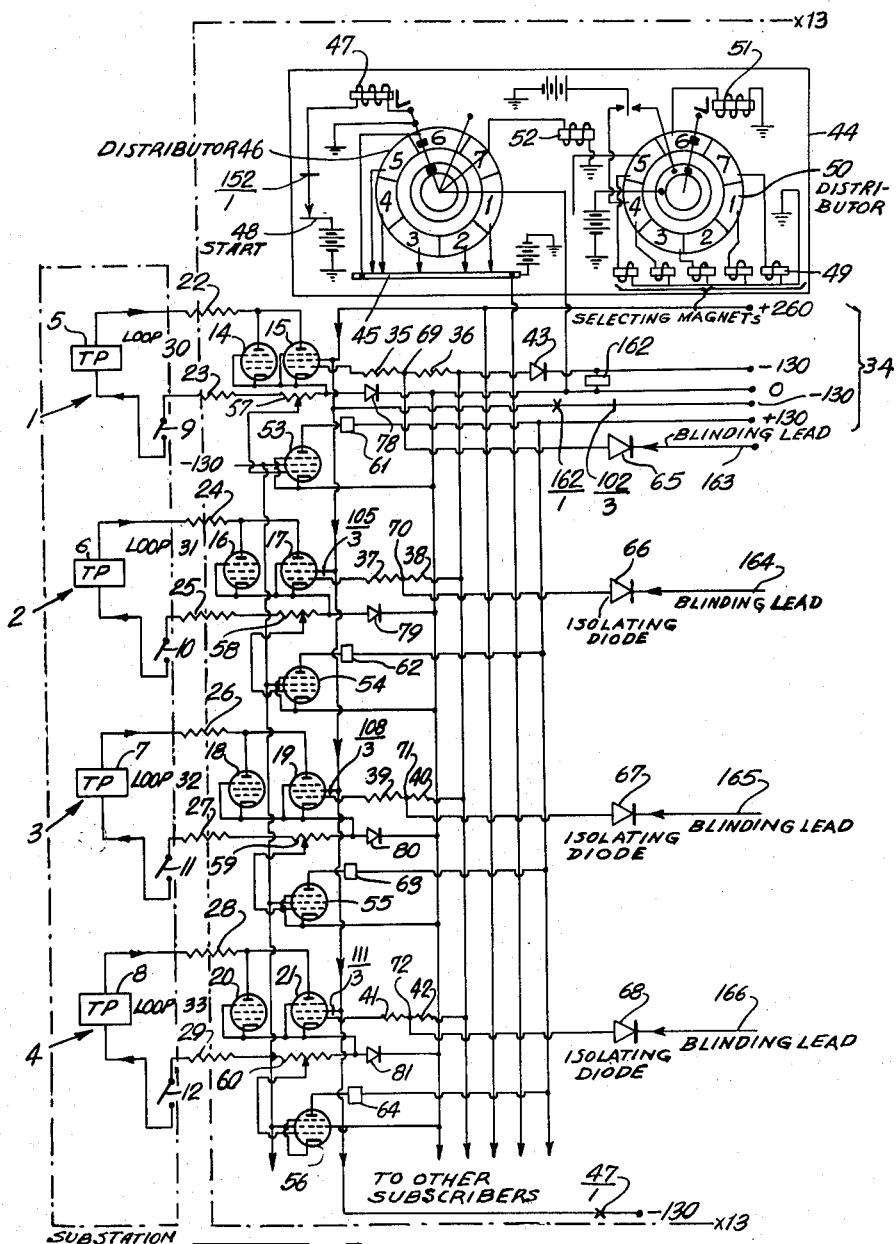
Figure 2:
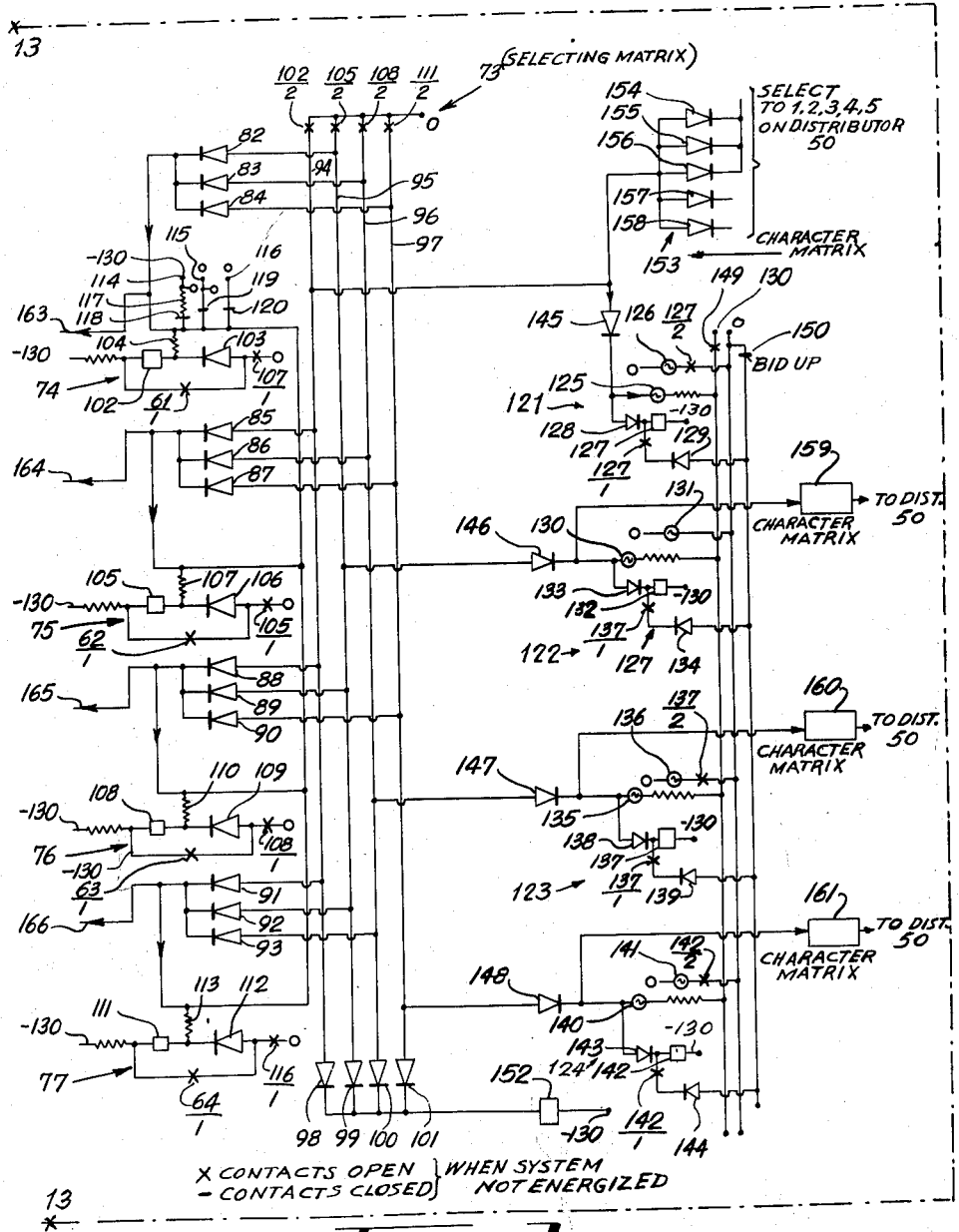

A better understanding of the invention may be had by referring to the following description taken in conjunction with the accompanying drawings in which FIGS. 1 and 2 illustrate, when placed together, a circuit schematic, partly in block diagram, of the auction system in which the invention is represented.

Considering the drawings, there is shown four of a number of subscribers' stations 1, 2, 3, 4, each provided with a teleprinter (T.P.) 5, 6, 7, 8. Each of the teleprinters 5, 6, 7, 8 are provided with a bidding key 9, 10, 11, 12, respectively.

Also shown in the drawings is the master office 13 in which there is included sending circuits consisting of pentode tubes 14, 15; 16, 17; 18, 19; 20, 21, having the anode and cathode electrodes connected to the subscribers' stations 1, 2, 3, 4, through the telegraph circuit conductors 22, 23; 24, 25; 26, 27; 28, 29, respectively to form the respective loops 30, 31, 32, 33. The cathode electrodes of each of the sending tubes 14, 15; 16, 17; 18, 19; 20, 21 are connected to a positive terminal of the energy source 34, while the control grid electrodes are connected through resistors 35, 36; 37, 38; 39, 40; 41, 42, to a negative terminal of the energy source 34 through diode 43. The screen grid of the sending tubes 14, 15; 16, 17; 18, 19; 20, 21 are connected to a positive terminal of the energy source 34. Connected across the control grid energy supply is the sending part of the teleprinter illustrating the essential elements required for the description of the invention which are the keyboard 45, distributor 46, start magnet 47, start switch 48. Also disposed in the teleprinter 44 is the receiving portion of the teleprinter showing the essential elements for the description of the invention which are the selecting magnets 49, distributor 50, start magnet 51, line relay 52. Further information may be obtained for a simplified teleprinter by referring to the Standard Handbook for Electrical Engineers, 9th edition, 1957, Section 22, 164, page 1980.

Also shown in the drawings are receiving circuits consisting of pentode tubes 53, 54, 55, 56, the control grids being connected to the potentiometers 57, 58, 59, 60, inserted in the respective loops 30, 31, 32, 33. The control relays 61, 62, 63, 64, are connected to the anode electrode of the respective receiving tubes 53, 54, 55, 56.

Also shown in the drawings are diodes 65, 66, 67, 68, the anodes being connected to the junction points 69, 70, 71, 72 of the respective resistors 35, 36; 37, 38; 39, 40; 41, 42 and the cathodes to the selecting diode matrix 73, and to the control circuits 74, 75, 76, 77. The diodes 78, 79, 80, 81 are isolating diodes, to isolate the respective loops 30, 31, 32, 33 from each other.

The selecting diode matrix 73 includes a set of diodes 82, 83, 84; 85, 86, 87; 88, 89, 90; 91, 92, 93 individual to each loop circuit and a set of conductors 94, 95, 96, 97, equal in number to the loop circuits. The anodes of the diodes 82, 83, 84; 85, 86, 87; 88, 89, 90; 91, 92, 93 are individually connected to the conductors 94, 95, 96, 97, with the exception of one conductor specific to a loop circuit 30, 31, 32, 33 and the cathodes, connected together, to the respective control circuits 74, 75, 76, 77 and the diodes 65, 66, 67, 68. The matrix 73 is also provided with the diodes 98, 99, 100, 101 individual to each of the conductors 94, 95, 96, 97.

The control unit 74 consists of the slow release relay 102, diode 103, resistor 104. Control circuits 75, 76, 77 are identical to control circuit 74, each consisting of a relay, a diode, a resistor 105, 106, 107; 108, 109, 110; 111, 112, 113.

Connected to the control circuits 74, 75, 76, 77, are the leads 114, 115, 116, lead 114 being provided with resistor 117, switch 118, lead 115 with switch 119 and lead 116 with switch 120.

Also connected to the diode matrix 73 are the bid-down, bid-up control circuits 121, 122, 123, 124. The bid-down circuit 121 consists of lamp 125 and the bid-up portion lamp 126, relay 127, diodes 128, 129. Bid-down, bid-up circuits 122, 123, 124 are identical to the bid-down, bid-up circuit 121 consisting of lamps, relays, diodes 130, 131, 132, 133, 134; 135, 136, 137, 138, 139; 140, 141, 142, 143, 144. Also shown are isolating diodes 145, 146, 147, 148. Also shown are bid-down and bid-up switches 149, 150.

Also connected to the diode matrix 73 is the tape transmitter control circuit 151 consisting of relay 152 and character diode matrix 153 consisting of diodes 154, 155, 156, 157, 158 with the anodes connected together and to the diode matrix 73 and to the bid-down, bid-up circuit 121 through diode 145. The cathodes of diode matrix 154 are connected to the tape transmitter unit 44.

Character matrices 159, 160, 161 are identical to character matrix 153 being connected to the distributor 50.

Relay 162 illustrates a voltage control means. Conductors are shown as 163, 164, 165, 166.

Operation of Circuit

In the idle condition, that is when the system is operating but not transmitting, the contacts of the keyboard 45 of teleprinter 44 are closed a short circuit is placed across the control grid cathode circuit of the sending repeater tubes 14, 15; 16, 17; 18, 19; 20, 21, the path being defined as source-34-78-cathode-grid-35-30-45 (keyboard). Current will therefore flow in the loops 30, 31, 32, 33. Due to the presence of resistors 57, 58, 59, 60 in the loops 30, 31, 32, 33, the receiving repeater tubes 53, 54, 55, 56 are cut off. Diodes 65, 66, 67, 68 remain non-conducting due to the contacts 102/2, 105/2, 108/2, 111/2, matrix 73, being open.

When the keyboard 45 of teleprinter 44 is operating, the contacts thereof are opening and closing corresponding to the signal being sent. This allows a —130 v. biasing voltage from the source 34 through diode 43, to appear between the control grids and the cathodes of the sending tubes 14, 15; 16, 17; 18, 19; 20, 21 so that the current in the loops 30, 31, 32, 33 ceases to flow. When, therefore, a punched tape, on which is recorded the desired information, such as a lot number of hogs together with the prices in a descending scale for the lot, is passed through the teleprinter 44, the opening and closing of the contacts of the keyboard 45 allows the information to be transmitted or broadcasted simultaneously to all the subscribers' stations.

Assume that the price being broadcasted reaches a figure which a subscriber, for example subscriber 1, wishes to pay for the lot. Under these conditions, the bidding key 9 at subscriber's station 1 is actuated so as to open the loop 30. The opening of loop 30 is effective to allow the receiving repeater tube 53 to conduct. Receiving repeater tube 53, in conducting, allows relay 61 to operate and in so doing, allows the contact 61/1, control circuit 74, to close.

During the period when relay 61 is released, relay 102 of the control circuit 74 is operated from energy source, through diode 103, relay 102 on the diode matrix 73. At this stage, contacts 102/1 (control circuit 74) 102/3 (cathode screen grid circuit 14, 15) are closed and contact 102/1, matrix 73 open.

The purposes of closing the contacts 102/2 on the diode 74 is to:

(1) Allow zero volts, through the diodes 85, 88, 91 on the matrix 73, on all the grids of the loop tubes other than that of the bidding subscriber. This effectively blinds any further teleprinter information being transmitted from the master office 13 to the subscribers other than the bidding subscriber.

(2) Prevent tie bids.

(3) Energize a lamp at the master office 13 to indicate the identity of the bidding subscriber.

(4) Disable the teleprinter.

(5) Operate the character diode matrix so as to print the bidding subscriber's code letters at the subscriber's teleprinter and at the master office.

When contact 61/1, of relay 61, closes, at the control circuit 74, relay 102 releases so that the contacts 102/1 and 102/2 open and close respectively and the latter in so doing allows zero voltage to be applied to the control grids of the tubes 16, 17; 18, 19; 20, 21 of the loops 31, 32, 33 through the diodes 85, 66; 88, 67; 91, 68 associated with the respective loops; tubes 14, 15 of the bidding subscriber's loop 30 remains conductive.

In order to prevent tie bids, it is necessary to maintain the relays 105, 108, 111 operated. For this purpose, a circuit is defined from each of the relays 105, 108, 111 through resistors 107, 110, 131 and the diodes 85, 88, 91 to the matrix 73 which holds the relays 105, 108, 111 operated while relay 102 is released.

When contact 102/2 closes in response to a bid-down indication, as described heretofore, a circuit is completed from the diode matrix 73 through diode 145, lamp 125 through bid-down closed switch 149 to the energy source.

If the prices represented on the punched tape are presented in an ascending scale, the operator switches the bid-up key 150 to the bid-up position, the bid-down switch 149 being open. Under these circumstances none of the bid-down lamps 130, 135, 141 can energize. Instead, the bid-up relay 127 operates over the circuit from energy source on diode matrix 73, diode 145, diode 128, relay 126 to energy source. Relay 127 therefore locks up through the energy source, switch 150, diode 129, contact 127/1, relay 127 to energy source. When contact 127/2 is therefore closed, the bid-up lamp 126 energizes where it is held operated by the lock-up circuit. The relay 102 is released, when loop 30 is closed, to wait for a higher bid. When another bid is received and another lamp, such as lamp 130 of registering circuit 121, energizes, the operator actuates the switch 150 which removes the lock-up path for the relay 127 extinguishing lamp 126 but leaves the second bid lamp energized. The bid-down is a tape transmitter operation while the bid-up is a manual keyboard operation.

When the bids are made as described heretofore, relay 152 of the tape transmitter control circuit 151 operates closing contact 152/1 and opening contact 152/2 on the teleprinter 44 so that the transmitter 46 is stopped from operating.

When a bid is received, the code number of the bidding subscriber and other information is recorded at the master office 13, a circuit being completed from the matrix 73, through the character diode 153, the respective diodes being connected to segments of teleprinter 44 which records this information and allows it to be transmitted to the bidding subscriber.

When the system is in the two-point condition, that is subscriber's station 1 for example connected to the register circuit 121, the cathode voltage of the tubes in the loop 30 for example is approximately zero volts with respect to ground, the same as all other loop tubes. In the broadcast or transmitting condition, when a "space" signal is sent on the system, the cathode voltage of all loop tubes drops to 130 volts with respect to ground. To allow a "space" signal to be sent in the two-point condition, diodes 78, 79, 80, 81 are connected from the cathode to the zero volts common point energy source 34. These diodes 78, 79, 80, 81 allow the cathode of the tube in the bidding subscriber's loop to drop to —130 volts which stops current flowing from the idle loops whose tube cathodes are at zero volts. This means there is a potential of 130 volts across the diode 78, in the circuit for the bidding subscriber and this opposes the —130 volts grid bias supply. To overcome this, a relay 162 is connected across the bias supply and when the keyboard or tape transmitter signal generator contacts open relay 126 operates. The contacts 162/1 of this relay 162 are used to cut tube off in the bidding subscriber's circuit by connecting —130 volts to the screen grid on the space signal. The other loop tubes are not cut off since the break circuit relays 102, 105, 108, 111 are held operated as the contacts 102/3, 105/3, 108/3, 111/3 are open, thus the —130 volts is not connected to the screens of these tubes.

By employing two pentodes in the loop circuits 30, 31, 32, 33, the voltage drop across the sender tubes 14, 15; 16, 17; 18, 19; 20, 21 is less than that encountered when a triode tube is employed. This has the effect of reducing loop resistance permitting longer loops to be used.

What is claimed is:

1. In a telegraph system, which includes a plurality of subscribers' stations, a master station, to which the subscribers' stations are connected by individual loops each loop being provided at the subscribers' station means to open and close the loops, comprising:

a teleprinter, having included a starting means, a pentode tube sending means, individual to each loop, the output being coupled to the loops and the control-grid cathode input circuit to the teleprinter so that marking and spacing signals are transmitted over the loops, an individual diode inserted in the control-grid circuit poled so as to prevent interaction between the loops, when the system is operating, short circuiting means, responsive to the operation of the teleprinter, when connected across the control-grid-cathode circuit, permits the flow of current in the loops, a pentode tube receiving means, included to each loop, having the input coupled to the loops, biasing means inserted in the loops effective to prevent or permit the operation of the receiving means when the loop is closed or open respectively, a first electromagnetic relay individual to each loop, responsive to the operation of the respective receiving means, first pair of contacts therefor, a control circuit, individual to each loop, a second electromagnetic relay having a second and a third pair of contacts therefor, a circuit completed through the said first pair of contacts effective to release the second electromagnetic relay when the first electromagnetic relay is operated, a selecting matrix which includes a series of conductors, each containing the said second contact, equal in number to the loop circuits, a series of sets of diodes each set being individual to a loop circuit, the anodes of each set being individually connected to the conductors with the exception of one conductor specific to a loop circuit, and the cathodes of each set being connected together, a circuit connecting the connected cathodes to the respective control circuit and to the control-grid of the respective sending pentode tube means, a diode included in such circuit with the anode connected to the control grid and the cathode to the connected cathodes, a diode connected in each of the conductors with the anodes individually connected to the second contacts, and the cathodes connected together, a third electromagnetic relay having a fourth pair of contacts, a connection between the said starting means and the fourth pair of contacts effective to disable the teleprinter when the third electromagnetic relay is released, a registering circuit individual to each loop connected to the respective specific conductor, a fourth relay connected across the cathode-control-grid circuit of the pentode tube sending means, responsive to the operation of the teleprinter, having a fifth pair of contacts, means for including the fifth pair of contacts and the third pair of contacts of the second electromagnetic relay in the cathode-screen-grid circuit of the pentode tube sending means, the third pair of contacts being closed when the second electromagnetic relay is operated.

2. In a telegraph system as defined in claim 1 having included therein a character matrix individual to each loop comprising:

a set of diodes having the cathodes individually connected to the teleprinter and the anodes, connected together, to the respective specific conductor, an additional diode having the cathode connected to the respective registering circuit and the anode to the specific conductor.

3. In a telegraph system as defined in claim 2 in which said sending pentode tube means comprises a pair of pentode tubes connected in parallel relation.

4. In a telegraph system as defined in claim 3 in which said registering circuit comprises:

a first, second, and third conductor, an indicating device connected to the cathode of the additional diode, in the first conductor, a switch inserted in the first conductor effective to open and close the energizing circuit for the first indicating device, a diode having the anode connected to the cathode of the additional diode and the cathode to the fifth electromagnetic relay having a sixth pair of contacts closed when the fifth electromagnetic relay is operated, diode having the cathode connected to the sixth pair of contacts and the anode to the third conductor, switch means inserted to the second conductor.

5. In a telegraph system as defined in claim 2 having in combination with the control circuit means connected in the circuit for controlling the operation of the second electromagnetic relay.

6. In a telegraph system as defined in claim 5 having in combination with the said control circuit, the said second electromagnetic relay having a seventh pair of contacts, a diode having the cathode connected to the second electromagnetic relay and the anode to the seventh pair of contacts, an energy source for the second electromagnetic relay.

No references cited.